United States Patent [19]

Brau et al.

[11] 4,189,686
[45] Feb. 19, 1980

[54] COMBINATION FREE ELECTRON AND GASEOUS LASER

[75] Inventors: Charles A. Brau; Stephen D. Rockwood; William E. Stein, all of Los Alamos, N. Mex.

[73] Assignee: The United States of America as represented by the United States Department of Energy, Washington, D.C.

[21] Appl. No.: 837,250

[22] Filed: Sep. 27, 1977

[51] Int. Cl.² .............................................. H01S 3/09
[52] U.S. Cl. ..................... 331/94.5 PE; 331/94.5 G; 331/94.5 M
[58] Field of Search ................. 331/94.5 G, 94.5 PE, 331/94.5 P, 94.5 D, 94.5 M

[56] References Cited

U.S. PATENT DOCUMENTS 3,665,336  5/1972  McLafferty .................... 331/94.5 D

OTHER PUBLICATIONS

Fominskii, JETP Letters, vol. 21, No. 2, pp. 58–59, (20 Jan. 1975).
Hoffman et al., Appl. Phys. Lett., vol. 28, No. 9, 1 May 1976, pp. 538–539.
Madey et al., Phys. Rev. Letters, vol. 36, No. 13, 29 Mar. 1976, pp. 717–720.
Semat, Intro. to Atomic & Nuclear Physics, 4th Ed., 1962, (Holt, Reinhart, N. Y.), pp. 568–569.

*Primary Examiner*—William D. Larkins
*Attorney, Agent, or Firm*—R. V. Lupo; William W. Cochran, II

[57] ABSTRACT

A multiple laser having one or more gaseous laser stages and one or more free electron stages. Each of the free electron laser stages is sequentially pumped by a microwave linear accelerator. Subsequently, the electron beam is directed through a gaseous laser, in the preferred embodiment, and in an alternative embodiment, through a microwave accelerator to lower the energy level of the electron beam to pump one or more gaseous lasers. The combination laser provides high pulse repetition frequencies, on the order of 1 kHz or greater, high power capability, high efficiency, and tunability in the synchronous production of multiple beams of coherent optical radiation.

36 Claims, 5 Drawing Figures

COMBINATION FREE ELECTRON AND GASEOUS LASER

BACKGROUND OF THE INVENTION

The present invention pertains generally to lasers and more particularly to multiple output lasers.

Various photochemical applications of lasers require lasers having specified wavelengths, pulse repetition frequencies, power, reliability, and efficiency, to provide a viable photochemical process. Additionally, many applications require a plurality of specified wavelengths which are produced in a synchronous manner, to achieve the desired results. The conventional manner of pumping various gaseous lasers such as Marx banks, discharges, etc., as disclosed in the background material of application Ser. No. 832,489 entitled "Microwave Accelerator E-Beam Pumped Laser" by Charles A. Brau et al., filed Sept. 12, 1977 does not provide either the reliability, pulse repetition frequency, efficiency, or average power required for many applications.

Although the microwave accelerator e-beam pumped laser disclosed in the above-identified application overcomes these disadvantages with regard to gaseous lasers for which the above process is most applicable in the production of ultraviolet radiation, a tunable infrared source which can produce synchronous pulses in combination with such a uv sources, is desirable. Gaseous lasers such as the $CO_2$ laser, HF laser, $CF_4$, etc., can produce ir radiation at specified wavelengths, and can provide some tunability by shifting from various rotational states. The range of tunability, however, is limited, due to various physical phenomena of the gaseous laser medium. Additionally, tunability is frequently limited to discrete quantum steps, rather than a continuously variable spectrum of frequencies. For this reason, a continuously tunable source which could also be operated in the uv, visible ir spectral regions would have great desirability.

SUMMARY OF THE INVENTION

The present invention overcomes the disadvantages and limitations of the prior art by providing a combination gaseous and free electron laser which is sequentially pumped by a microwave linear accelerator. The free electron laser provides a continuously tunable source of coherent radiation at high powers. The electron beam produced by the microwave accelerator and used to activate the free electron laser is channeled through a gaseous laser which produces a high pulse repetition frequency, high power signal in a highly efficient manner.

It is therefore an object of the present invention to provide a combination laser for photochemical applications.

It is also an object of the present invention to provide a combination laser for photochemical applications which is efficient in operation.

Another object of the present invention is to provide a high pulse repetition frequency high power combination ultraviolet and tunable infrared laser.

Another object of the present invention is to provide a multiple laser for producing a plurality of coherent optical radiation signals.

Other objects, advantages and novel features of the invention will become apparent from the following detailed description of the invention when considered in conjunction with the accompanying drawings, wherein:

DETAILED DESCRIPTION OF THE PREFERRED EMBODIMENT OF THE INVENTION

Figure 1:
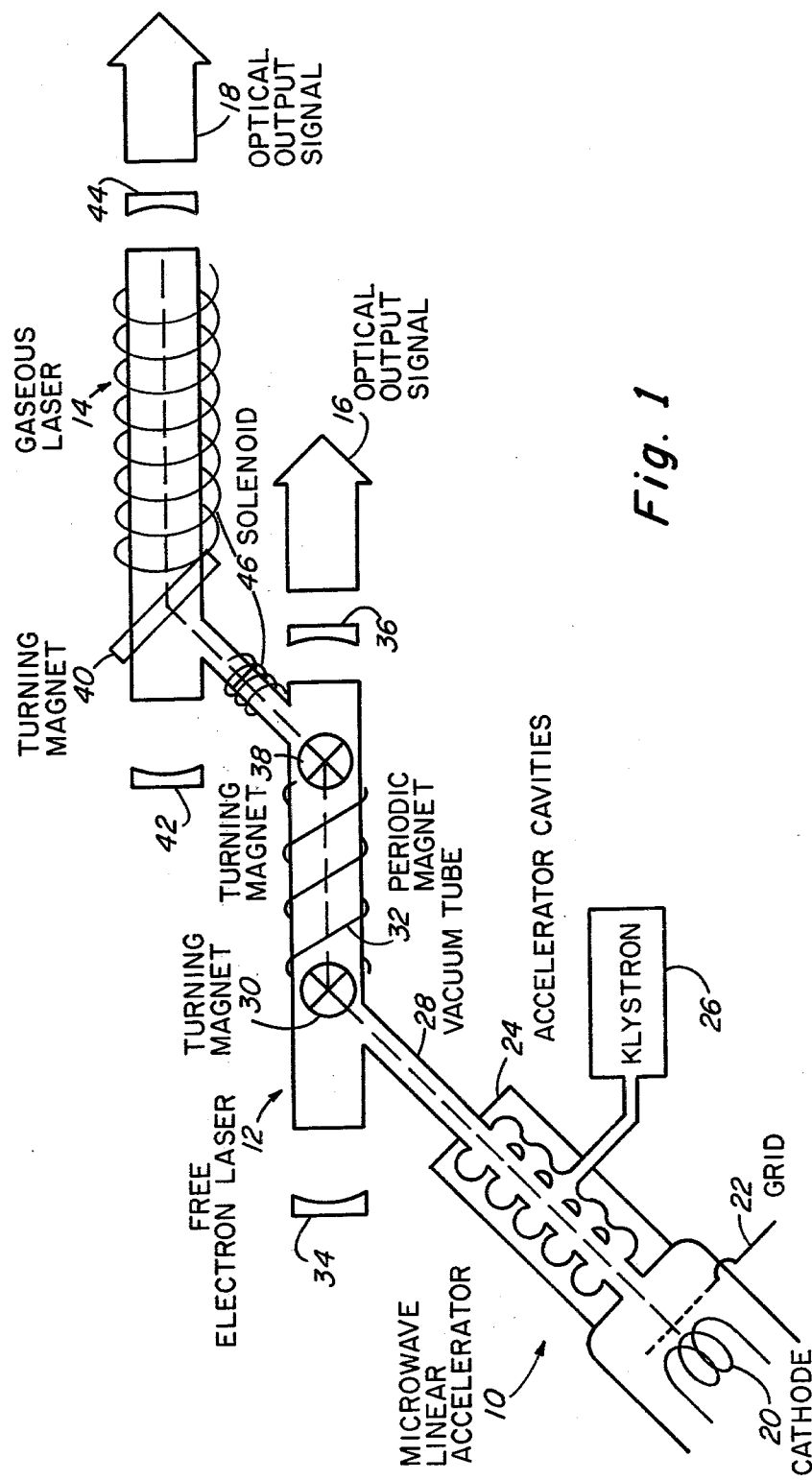
FIG. 1 discloses a schematic diagram of the preferred embodiment of the invention.

Referring to the drawings, wherein like reference numerals designate identical or corresponding parts throughout the several views, FIG. 1 discloses a schematic diagram of the preferred embodiment of the invention. The preferred embodiment comprises a microwave linear accelerator 10, a free electron laser 12, and a gaseous laser 14. According to the preferred embodiment, free electron laser 12 produces an optical output signal 16 in the infrared spectral region while gaseous laser 14 produces an optical output signal 18 in the ultraviolet spectral region, although each could be made to operate in other spectral regions.

Microwave linear accelerator 10 comprises a cathode 20 which produces electrons controlled by grid 22. The electrons are bunched and injected in proper phase with the microwave power into the accelerator cavities 24. Accelerator cavities 24 accelerate the electron beam to the desired voltage level, e.g., 10 MeV, in response to microwave energy generated by klystron 26. The relativistic electron beam produced by the microwave linear accelerator 10 travels through vacuum tube 28 and is directed down the cavity of the free electron laser 12 by turning magnet 30. A periodic magnetic field is produced by periodic magnet 32 such that when the beam of relativistic electrons is passed through the periodic magnetic field, electrons traversing this field undergo forced oscillations and emit bremsstrahlung radiation in the forward direction. The optical resonant cavity for the free electron laser 12 is formed by optical reflectors 34 and 36.

The advantages of the free electron laser are its tunability and its scalability to high powers. Tunability is achieved by varying the magnetic period of the periodic magnet 32 and the electron engery. The potential for high power of the free electron laser 12 rests in the ability of the microwave driven accelerator 10 to provide large powers. Since there is no medium, either gaseous or crystalline, which will distort with heat, beam quality of the free electron laser 12 does not degrade at high average power or high pulse repetition frequency.

The relativistic beam is directed from the free electron laser 12 to the longitudinal axis of the gaseous laser 14 by turning magnets 38 and 40. The gaseous laser 14 operates in the manner disclosed in the above-identified application by Charles A. Brau et al. The optical resonant cavity of the gaseous lasers is formed by optical reflectors 42 and 44. Solenoid 46 prevents dispersion of the electron beam from the axis of the gaseous laser 14. The gaseous laser 14 is designed to efficiently absorb the relativistic electron beam in the manner disclosed in the above-identified application. The parameters which may be varied to achieve efficient absorption include increasing the pressure of the gaseous laser medium, extending the length of the gaseous laser medium cavity, and providing magnetic mirrors for retaining the electron beam within the cavity. Efficient absorption characteristics of the gaseous laser 14 overcome the disadvantages of the low efficiency of the free electron laser 12; i.e., complete absorption of the relativistic beam within the gaseous laser 14 provides maximum energy conversion of the electron beam energy to photon energy for the combined system. Although the lower efficiency of the free electron laser 12 results in a somewhat lower power output in comparison to the gaseous laser 14, i.e., as much as 100 fold difference, many photochemical applications are well suited for such a ratio of output powers.

Figure 2:
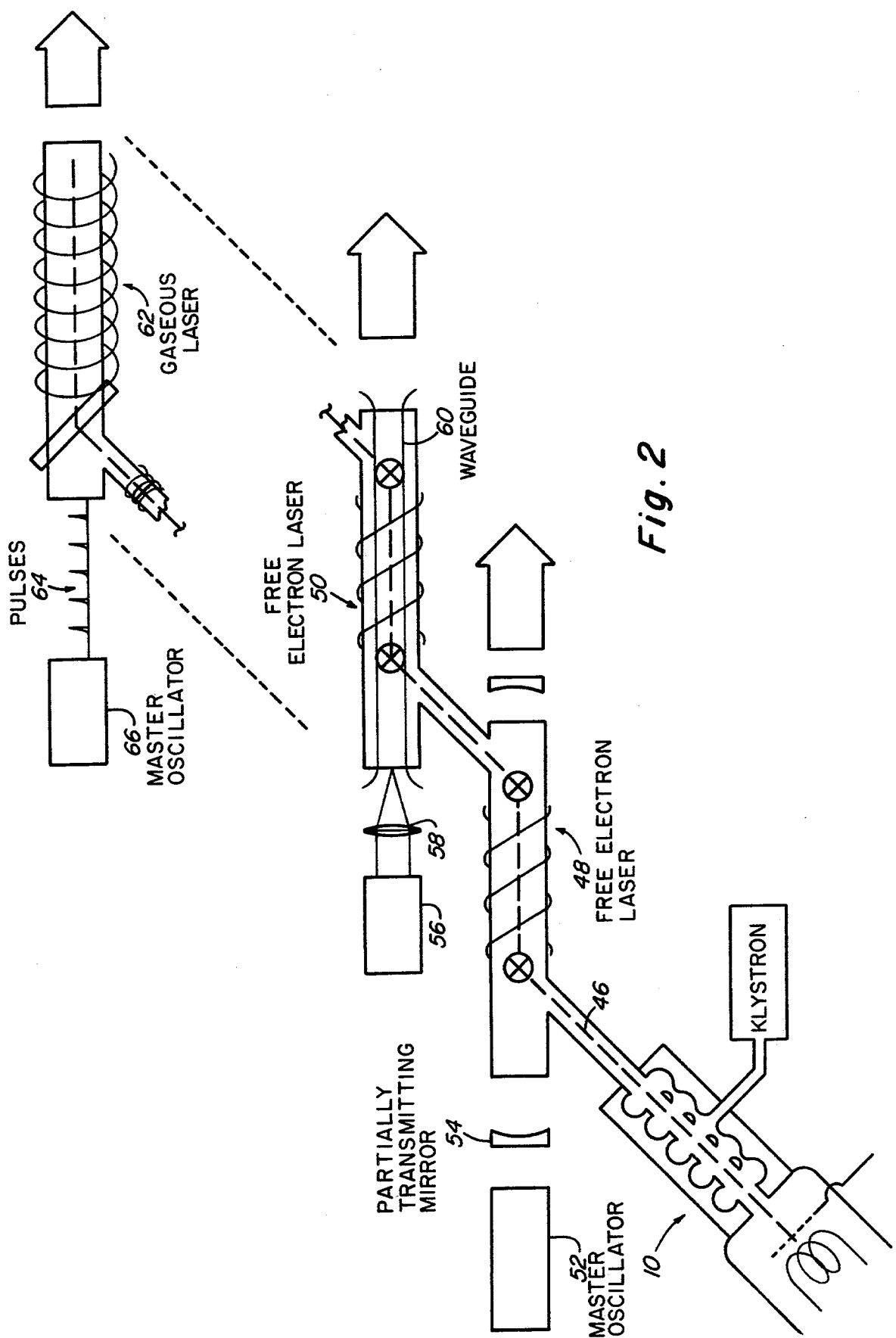
FIG. 2 discloses a schematic diagram of alternative arrangements of the preferred embodiment of the invention.

FIG. 2 discloses several variations of the preferred embodiment of FIG. 1. Relativistic electron beam 46 produced by microwave linear accelerator 10 is applied to a series of free electron lasers 48 and 50. As schematically shown in FIG. 2, a multiplicity of free electron lasers can be operated from a single relativistic electron beam 46 in the manner disclosed. Free electron laser 48 comprises an injection-locked laser which provides frequency stability and narrow bandwidth. Free electron laser 48 operates in an amplification mode by amplifying signals produced by master oscillator 52 injected into the laser cavity via partial reflector 54.

Free electron laser 50 operates in an amplification mode as a waveguide laser. A master oscillator 56 produces a desired signal which is focused via lens 58 at the entrance of a waveguide 60. The waveguide can be coated with a dielectric to decrease the propagation velocity and thereby achieve a shorter wavelength. Additional free electron lasers can be operated in any conventional manner for obtaining a desired signal and can be connected in combination as schematically shown in FIG. 2.

Gaseous laser 62 can, additionally, be operated in an amplification mode from pulses 64 produced by a master oscillator 66 to more accurately control frequency stability, bandwidth, etc.

Figure 3:
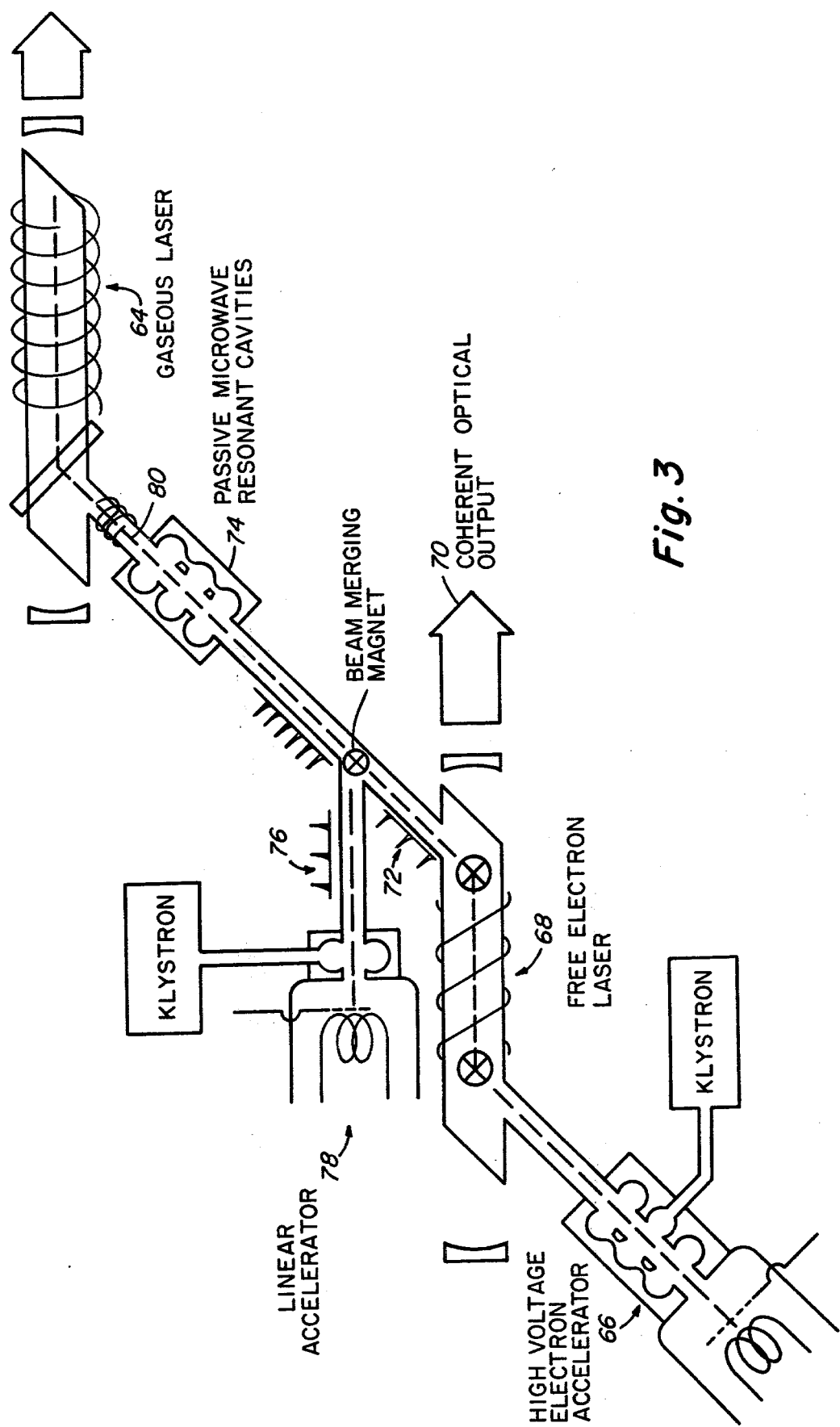
FIG. 3 discloses a schematic diagram of an arrangement for reducing electron energy of the relativistic electron beam through the use of an additional linear accelerator for efficient operation of the preferred embodiment of the invention.
Figure 4:
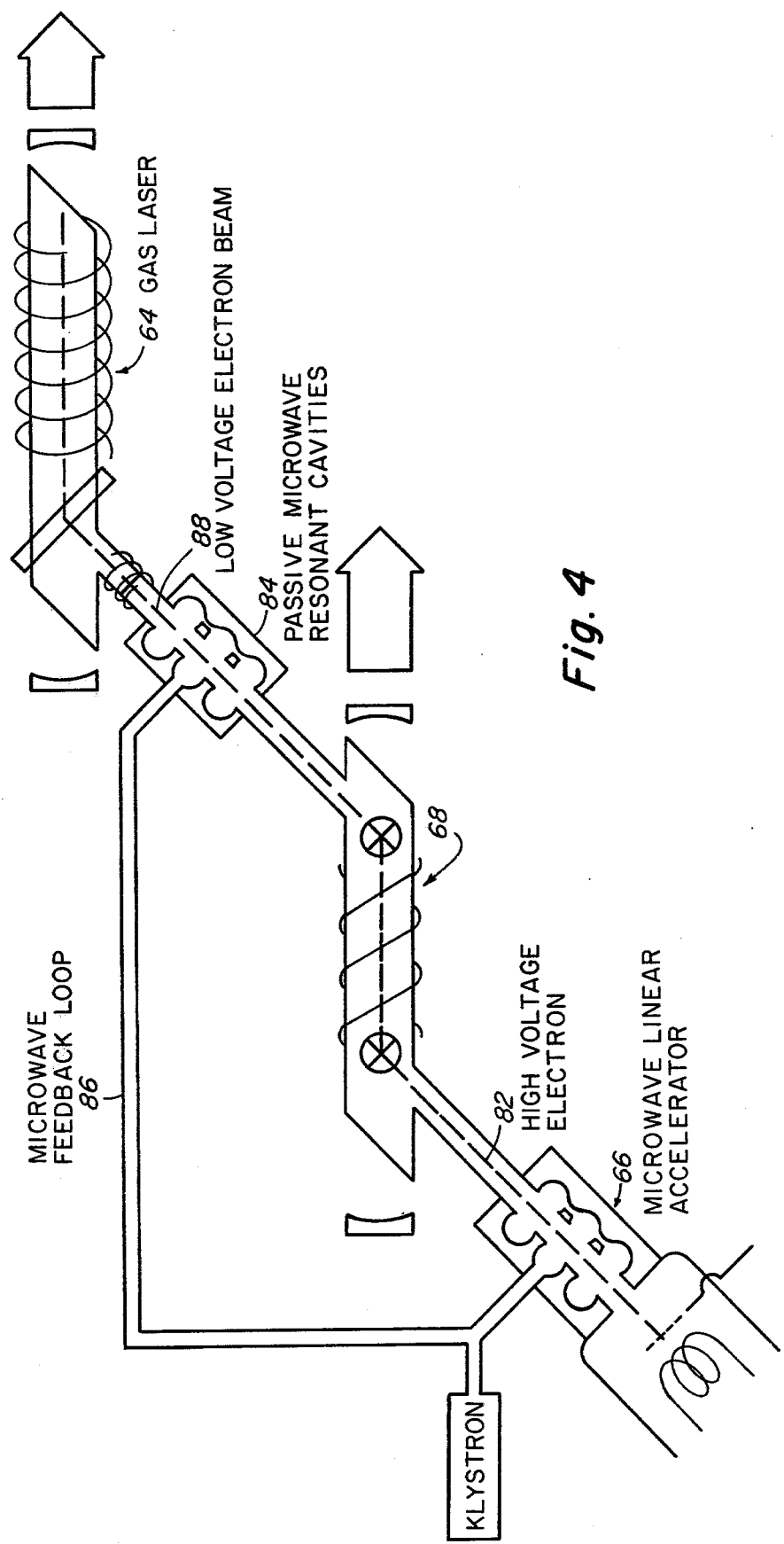
FIG. 4 discloses a schematic diagram of an alternative arrangement for reducing electron energy to efficiently pump both the free electron laser and gaseous laser.
Figure 5:
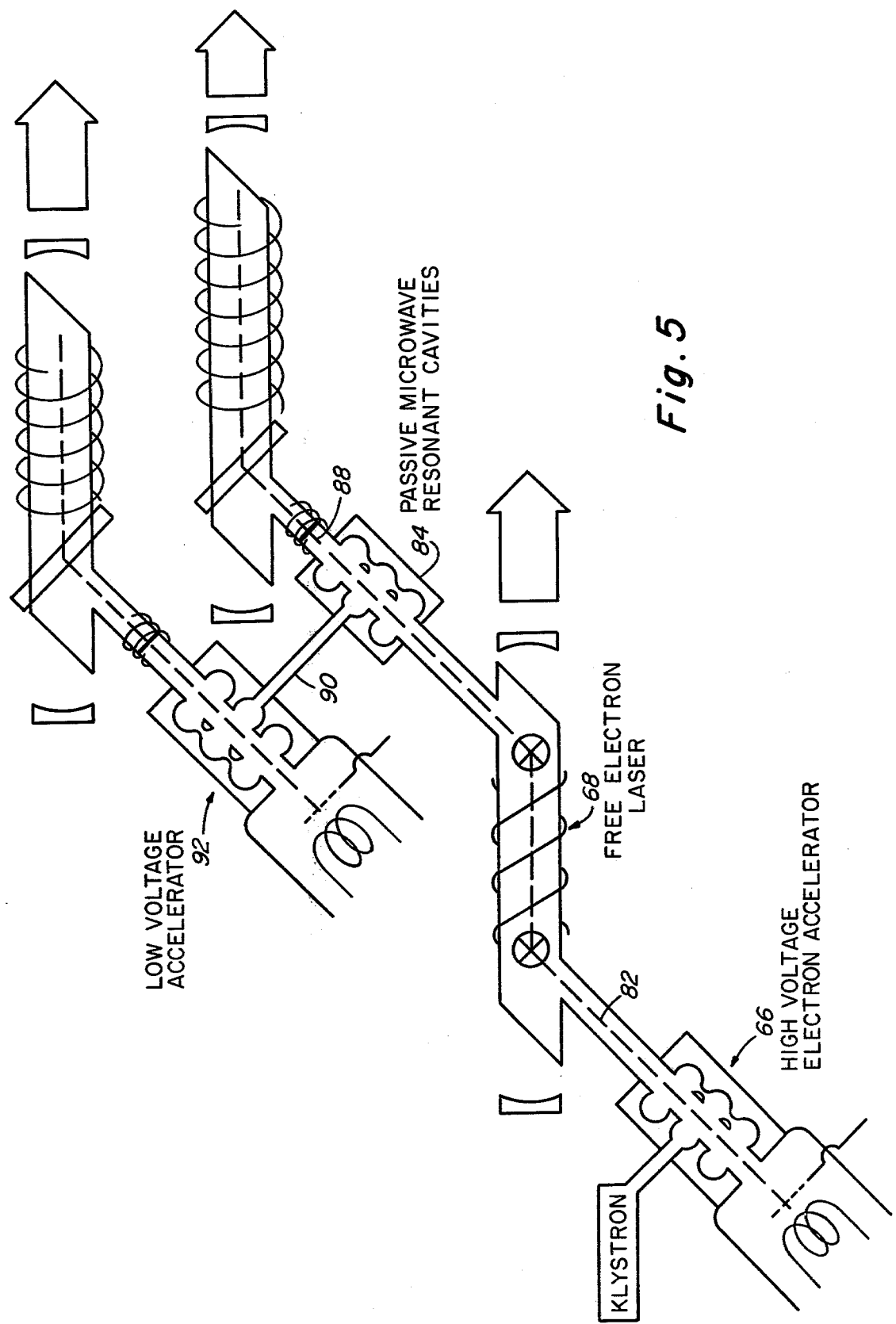
FIG. 5 discloses a schematic diagram for efficiently pumping multiple gaseous lasers.

FIGS. 3, 4, and 5 disclose various arrangements for reducing the voltage of the relativistic electron beam prior to application to the gaseous laser. Since the free electron laser operates more effectively with the high voltage electron beam, i.e., on the order of 20 MeV, and gaseous lasers operate more effectively with lower voltage electron beams, it is advantageous to decrease the voltage of the relativistic electron beam before application to the gaseous lasers without reducing the overall efficiency of the system. This can be accomplished in various manners as disclosed in FIGS. 3, 4, and 5.

As disclosed in FIG. 3, a high voltage electron accelerator 66 produces a high voltage electron beam on the order of ~20 MeV or greater. This relativistic electron beam is applied to free electron laser 68 which effectively produces coherent optical radiation 70 at a desired frequency. The relativistic electron beam pulses 72 are then applied to passive microwave resonant cavities 74, out of phase with low voltage relativistic electron beam pulses 76 produced by a low voltage linear accelerator 78. The out of phase high voltage electron beam pulses 72 are reduced in voltage in the passive microwave resonant cavity 74. Low voltage pulses 76 are applied to the cavity 74 in phase such that the voltage of high voltage pulses 72 is reduced and the voltage of low voltage pulses 76 is increased. Therefore, the overall voltage of the relativistic beam 80 applied to gaseous laser 64 is reduced with a minimal loss of efficiency.

FIG. 4 discloses an alternative device for decreasing electron beam voltage to a gaseous laser without significantly reducing overall efficiency of the system. Similar to FIG. 3, microwave accelerator 66 produces a high voltage electron beam 82 which is applied to a free electron laser 68. The high voltage electron beam 82 is then directed to passive microwave resonant cavities 84 which function to reduce the energy level of the electrons and, in so doing, produce microwave energy which is channeled back to the microwave linear accelerator 66 via microwave feedback loop 86 providing additional microwave energy to operate microwave linear accelerator 66. The low voltage electron beam 88 emitted from the passive microwave resonant cavities 84 is then applied to gaseous laser 64. By channeling back the microwave energy produced in reducing the voltage of the electron beam, the overall efficiency of the system is maintained.

FIG. 5 discloses a device for pumping two or more gaseous lasers with low voltage relativistic electron beams from a single high voltage relativistic electron beam. Again, high voltage electronic accelerators 56 produce a high voltage relativistic electron beam 82 which is directed through the free electron laser 68 to efficiently produce coherent optical radiation. The high voltage relativistic electron beam 82 is then directed to passive microwave resonant cavities 84 which reduce the voltage level of the electron beam and generate microwave radiation which is channeled by microwave channel 90 to drive a low voltage accelerator 92. Depending upon the voltage of the high voltage relativistic electron beam 82, two or more low voltage accelerators and gaseous lasers can be operated in this manner. Alternatively, the relativistic beam produced by low voltage accelerator 92 can be combined with relativistic beam 88 to drive a single gaseous laser.

The present invention therefore provides a combined free electron and gaseous laser for producing multiple coherent output signals in a reliable and efficient manner. The present invention also provides high pulse repetition frequencies and high power from both the free electron and the gaseous laser. The overall efficiency of the system is extremely high and the power ratios obtainable from the free electron laser and gaseous laser are useful in many photochemical applications.

Obviously many modifications and variations of the present invention are possible in light of the above teachings. For example, any desired number of free electron lasers or gaseous lasers can be utilized practicing the teachings of the present invention. More specifically, by limiting electron scattering by solenoids in the gaseous laser, it is possible to serially operate two or more gaseous lasers from a single electron beam. It is therefore to be understood that within the scope of the appended claims the invention may be practiced otherwise than is specifically described.

What is claimed is:

1. A high pulse repetition frequency, high power, combination ultraviolet and tunable infrared laser comprising:
   microwave linear accelerator means for producing a relativistic electron beam;
   free electron laser means for producing tunable infrared radiation in response to interaction of said relativistic electron beam with a spatially periodic magnetic field;
   gaseous molecular laser means for producing ultraviolet radiation in response to said relativistic electron beam;
   means for sequentially directing said relativistic electron beam through said free electron laser means and said gaseous molecular laser means.

2. The combination laser of claim 1 wherein said free electron laser means comprises a free electron laser amplifier.

3. The combination laser of claim 1 wherein said free electron means comprises a free electron laser oscillator.

4. The combination laser of claim 1 wherein said gaseous molecular laser means comprises a gaseous molecular laser amplifier.

5. The combination laser of claim 1 wherein said gaseous molecular laser means comprises a gaseous molecular laser generator.

6. The combination laser of claim 2 wherein said gaseous molecular laser means comprises a gaseous molecular laser amplifier.

7. The combination laser of claim 3 wherein said gaseous molecular laser means comprises a gaseous molecular laser amplifier.

8. The combination laser of claim 2 wherein said gaseous molecular laser means comprises a gaseous molecular laser oscillator.

9. The combination laser of claim 3 wherein said gaseous molecular laser means comprises a gaseous molecular laser oscillator.

10. The combination laser of claim 1 wherein said means for sequentially directing said electron beam comprises a plurality of turning magnets.

11. The combination laser of claim 1 wherein said relativistic electron beam has an energy level of approximately 10 MeV.

12. The combination laser of claim 1 wherein said free electron laser means is formed from a waveguide.

13. A high pulse repetition frequency, high power, multiple laser for producing at least two coherent output beams comprising:
   microwave linear accelerator means for producing a relativistic electron beam;
   means for directing said electron beam through free electron laser means having a spatially periodic magnetic field for interaction with said relativistic electron beam to produce a first coherent output beam;
   means for directing said electron beam from said free electron laser means through a gaseous laser to produce a second coherent output beam.

14. The multiple laser of claim 13 wherein said first coherent output beam produced by said free electron means comprises a tunable infrared beam.

15. The multiple laser of claim 13 wherein said second coherent output beam produced by said gaseous laser comprises an ultraviolet beam.

16. A multiple laser for producing a plurality of coherent optical radiation signals comprising:
   microwave linear accelerator means for producing a relativistic electron beam;
   free electron laser means for producing coherent optical radiation in response to interaction of said relativistic electron beam with a spatially periodic magnetic field;
   gaseous laser means for producing coherent optical radiation in response to said relativistic electron beam.

17. The multiple laser of claim 16 further comprising means for sequentially directing said relativistic electron beam through said free electron laser means and said gaseous laser means.

18. The multiple laser of claim 16 wherein said free electron laser means comprises a plurality of free electron laser oscillators.

19. The multiple laser of claim 16 wherein said free electron laser means comprises a plurality of free electron laser amplifiers.

20. The multiple laser of claim 16 wherein said free electron laser means comprises a combination of free electron laser oscillators and free electron laser amplifiers.

21. The multiple laser of claim 16 wherein said gaseous laser means comprises a gaseous laser amplifier.

22. The multiple laser of claim 16 wherein said gaseous laser means comprises a gaseous laser oscillator.

23. The multiple laser of claim 16 wherein said free electron laser means comprises at least one waveguide laser.

24. The multiple laser of claim 16 wherein said coherent optical radiation produced by said free electron laser means comprises ultraviolet radiation.

25. The multiple laser of claim 16 wherein said coherent optical radiation produced by said free electron laser means comprises variable radiation.

26. The multiple laser of claim 16 wherein said coherent optical radiation produced by said free electron laser comprises infrared radiation.

27. The multiple laser of claim 16 wherein said coherent optical radiation produced by said free electron laser comprises a combination of infrared and ultraviolet radiation.

28. The multiple laser of claim 16 wherein said coherent optical radiation produced by said free electron laser comprises a combination of ultraviolet and visible radiation.

29. The multiple laser of claim 16 wherein said coherent optical radiation produced by said free electron laser comprises a combination of infrared and visible radiation.

30. The multiple laser of claim 16 wherein said coherent optical radiation produced by said free electron laser comprises a combination of ultraviolet, visible, and infrared radiation.

31. The multiple laser of claim 16 wherein said coherent optical radiation produced by said gaseous laser means comprises infrared radiation.

32. The multiple laser of claim 16 wherein said coherent optical radiation produced by said gaseous laser means comprises visible radiation.

33. The multiple laser of claim 16 wherein said coherent optical radiation produced by said gaseous laser means comprises ultraviolet radiation.

34. The multiple laser of claim 16 further comprising:
   passive microwave resonant cavities disposed between said free electron laser means and said gaseous laser means; and, additional linear accelerator means for injecting an electron beam into said passive microwave resonant cavities, out of phase with said relativistic electron beam produced by said microwave linear accelerator means.

35. The multiple laser of claim 16 further comprising:
passive microwave resonant cavities disposed between said free electron laser means and said gaseous laser means; and,
a microwave feedback loop connected between said passive microwave resonant cavities and said microwave linear accelerator means.

36. The multiple laser of claim 16 further comprising:
passive microwave resonant cavities disposed between said free electron laser means and said gaseous laser means for reducing the voltage of said relativistic electron beam emitted from said free electron laser means;
means for channeling microwave radiation produced by said passive microwave resonant cavities in response to said relativistic electron beam;
additional linear accelerator means for producing an additional relativistic electron beam in response to microwave radiation channeled from said voltage reducing cavities.

* * * * *